May 2, 1961  B. C. MAITENAZ  2,982,058
CUTTING MACHINE, IN PARTICULAR FOR
SPHEROIDAL OR TOROIDAL SURFACES
Filed May 24, 1960  2 Sheets-Sheet 1

2,982,058
Patented May 2, 1961

2,982,058

CUTTING MACHINE, IN PARTICULAR FOR SPHEROIDAL OR TOROIDAL SURFACES

Bernard Cretin Maitenaz, Joinville-le-Pont, France, assignor to Societe des Lunetiers Cottet Poichet, Tagnon & Cie, Paris, France Filed May 24, 1960, Ser. No. 31,314

Claims priority, application France June 2, 1959

8 Claims. (Cl. 51—124)

It is customary, with machine tools, to have recourse to three coordinates $x$, $y$, $z$ at right angles to one another in order to determine rectilinear displacements. Thus, in the case of milling machines, the tool-holder is generally possessed of a vertical motion ($z$) whereas the work-piece is mounted on the cross-sliding platen ($x$) of a longitudinal carriage ($y$).

When it is desired to define volumes of complex shape, recourse is had to jig grinders in which the accuracy of each displacement is very high. With this type of machine it is possible to machine cams from point to point and, hence, volumes also.

On occasion, recourse to the three perpendicular axes presents certain practical difficulties. In such cases, use is made of an index-plate, having a vertical or horizontal axis, mounted on one of the carriages of the machines referred to.

The majority of realizations in mechanical engineering can be handled with accuracy in this fashion. Some, however, do not readily adapt themselves to this form of generation using rectangular or semi-polar coordinates, and these realizations are those which involve the generation of spheroidal or toroidal surfaces. In such cases, it is preferable to use the polar type of locating set-up forming the object of the present invention.

This machine for cutting work-pieces, in particular to impart a spheroidal or toroidal surface, is characterized in that the mount onto which is fixed the work-piece is mounted for dual pivoting action about two axes at right angles to each other and that it can be placed in successive positions by angular displacements located with reference to those two axes and offered up to a rotating tool which is translated relative to those two axes according to each of these successive positions.

The characteristics and advantages of the invention will become more clearly apparent from the description given below by way of example only and not in a limiting sense, with reference to the drawings in which.

In order to increase the relative machining accuracy of a part having a shape fairly close to that of a sphere, recourse is had according to the invention to a set-up which enables each work area on that surface to be located in polar coordinates about its center of curvature.

Figure 1:
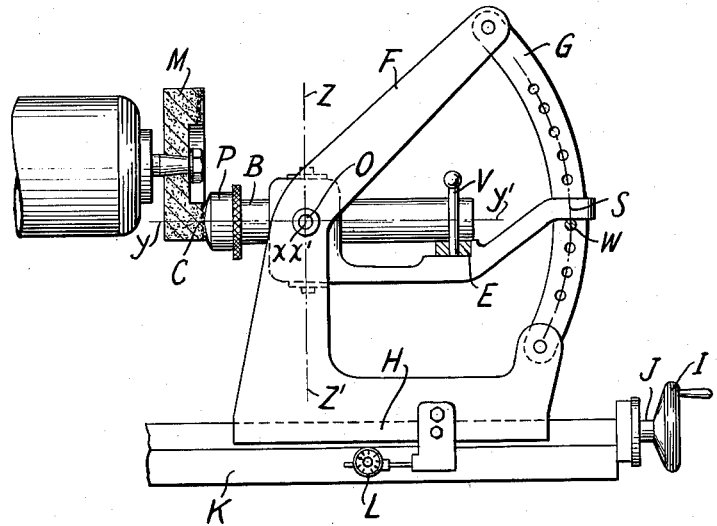
Figure 1 is a lateral view of the machine.
Figure 2:
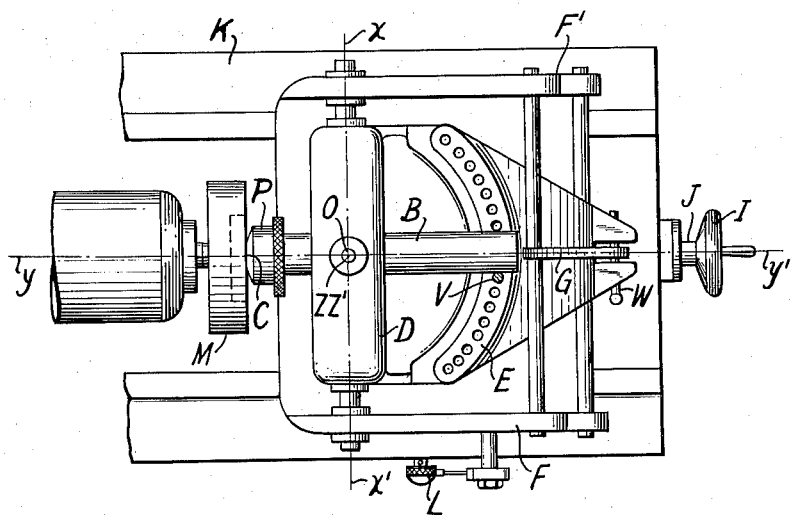
Figure 2 is the corresponding plan view.

As shown in Fig. 1, the method of mounting the work-piece P provides two degrees of freedom which correspond to rotation about two axes $xx'$ and $zz'$ intersecting at a point O. The mount B for the work-piece P is located on an axis $yy'$ passing through the point O and is positioned in relation to that point so that OC is equal to the reference radius of curvature adopted for the spheroidal surface.

This mount B carrying the work-piece P is rotatable about the axis $zz'$ within a gimbal D which is itself rotatable about a horizontal axis $xx'$ by the provision of two journals supported in bearings embodied in the plates F and F'. Coordinate location can be effected simply by the provision of positioning holes into which locate pins V and W, the holes being provided in a sector E integral with the gimbal D for motion about $zz'$ and in a sector G integral with the plates F and F' for motion about the axis $xx'$.

The plates FF' are carried by a carriage H mounted for sliding motion on a stand K and displaceable by means of a precision screw J which is rotatable by means of a hand-wheel I. The penetration depth obtained with the hand-wheel I can be read either on a dial integral with the stand K or on a comparator L integral with the stand and thrusting against a lug on the carriage H.

If the grinder M is of the plane type, as shown in Fig. 1, it is therefore possible with such an arrangement to obtain, by a process of successive tangential planes, a surface the discrepancy of each of whose points with respect to the reference sphere of radius CO will have been precomputed.

Figure 3:
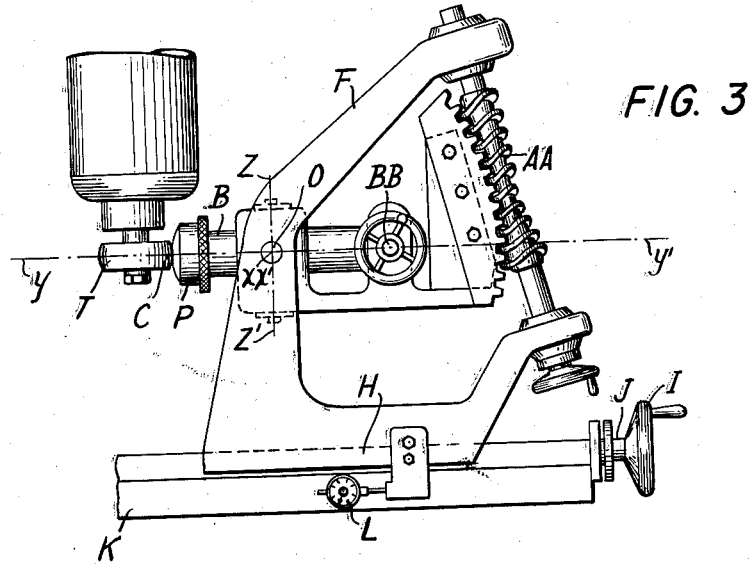
Figure 3 shows in the same way as Fig. 1 a variant on the means for controlling the angular displacements of the mount.
Figure 4:
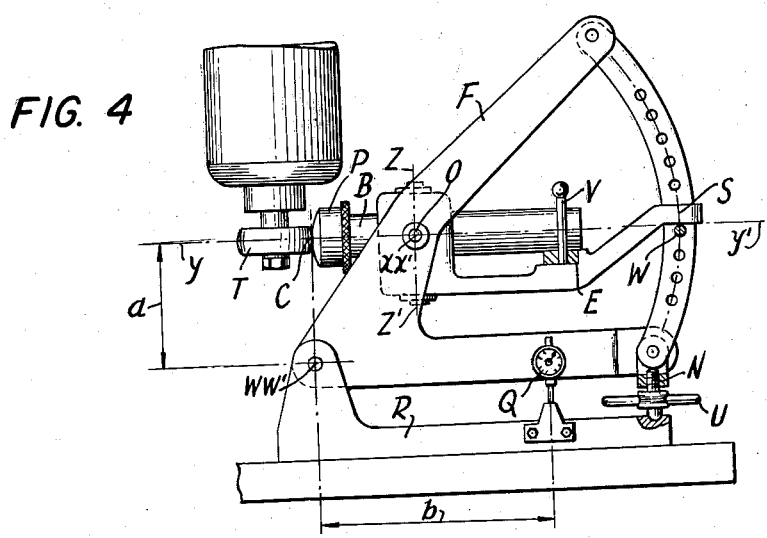
Figure 4 shows, in the same manner, a variant on the method of controlling the relative travel motion of the tool.

Certain details in the above description have been voluntarily simplified in the interests of clarity, but it is possible, without departing from the scope of the invention, to have recourse to arrangements which are more accurate or even different. As an example, location of the angles of rotation about the axes $xx'$ and $zz'$ can be obtained not by a pin locating with holes but by rotation of a worm on a toothed sector as shown in Fig. 3. In that case, use is made of one or two worm-and-sector systems depending on whether this arrangement is adopted for one only or both of the plane displacements. Similarly, penetration of the grinder into the work-piece can be effected by travel motion of the rotating tool, the support remaining stationary on the stand. This penetration can also be controlled by a tilting motion about an auxiliary axis shown, on end, on Fig. 4 at $ww'$. This axis is placed parallel to the axis $xx'$ along the working plane of the grinder, and tilting about this axis is controlled by a screw N rotatable by means of a tommy-bar U. A comparator Q carried by one of the plates F or F' and thrusting against the rest R then enables the penetration depth to be measured, with due regard for the ratio between the lever-arms $a$ and $b$.

Figure 5:
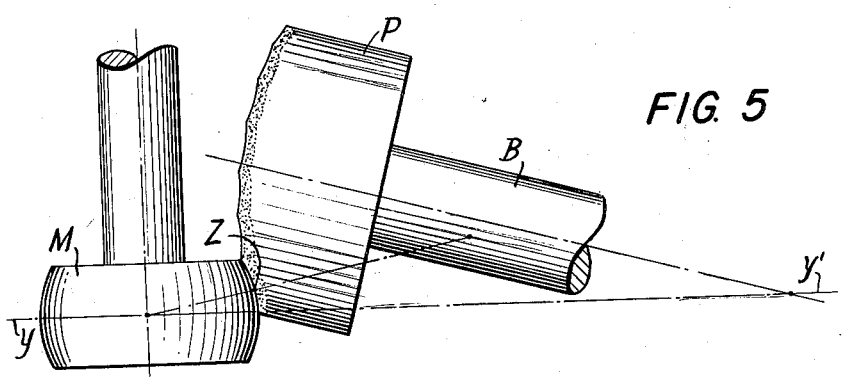
Figure 5 is an explanatory diagrammatic illustration of the manner of operation of a tool having a spherical surface.

When the surface differs too greatly from a sphere, that is to say when the abrasions made at different points are too unlike one another, due account must be taken of the shift of the point of contact Z with the grinding-wheel (Fig. 5). To lessen this drawback, recourse is had to a spherical grinding-wheel, as shown in Fig. 3, the center T of which is located on the axis $yy'$. The smaller the radius of this grinding-wheel, the smaller the shift of the contact points; on the other hand, the smaller the radius of the grinding-wheel, the more the intersections of the adjacent facets obtained in this way will protrude. In practice, for surfaces for which the variations in penetration are of the order of 1 mm., a radius of the order of 60 mm. is adopted, which very substantially reduces the shift of the tangential point without producing edges which protrude too much. Adoption of such a radius enables a correct surface to be obtained with abrasions at every millimeter.

To achieve generation of this sort, machine component elements will be adopted such that the distance OS is a multiple of OC, in order to be able to accurately locate the drillings in the part G which are used to locate the machining operations. Should it be desired to obtain an abrading action every two millimeters, and OS equal to 3 OC, all that is necessary is for the drillings in G to be three millimeters apart. This likewise applies for location about the axis zz'.

Depending upon whether such a set-up is adapted to a special machine or to a classic one, be it a miller or a grinder, the horizontal layout as described can be abandoned in favor of a vertical layout, for example. The latter arrangement indeed offers the advantage of reducing the overhang which might arise in the horizontal arrangement.

The machining of such parts is usually fairly protracted owing to the very high number of penetrations required.

The simple arrangement described above can therefore be usefully supplemented by the addition of an automatic punch-card form of movement control. To this end, all that is required is for the screws AA and BB in Fig. 3 to be electrically operated to insure automatic displacement from one facet to the next or from one row of facets to the next row, rotation of the hand-wheel I controlling the penetration being then achieved by means of electromechanical or hydraulic devices receiving data from the same punch-card as the one which has concurrently operated the screws AA and BB.

To obtain fine-quality, high-precision work, recourse will preferably be had, as described precedingly, to grinding whereas if precision is of secondary importance only, the use of a cutter may suffice.

In the description given above, the axes zz' and xx' are assumed to intersect, which makes it possible to produce surfaces with reference to a sphere of radius CO. In the event that the overall appearance of the surface to be generated is to be toroidal rather than spherical, it may be preferable to use a coordinate-type machine in which the axes xx' and yy' are no longer intersecting but nevertheless remain perpendicular to each other, this relative position with respect to the grinding-wheel being then a function of the reference torus adopted.

If the part to be obtained is to have a concave spheroidal shape, the mount B and the gimbal D in particular must be designed so that the spherical-surfaced grinding-wheel is centered on the point O, the radius of the grinding-wheel being then caused to be less than the radius CO of the reference sphere.

What I claim is:

1. A machine for cutting parts to be machined by succesive cuts, comprising a support, a gimbal mounted for oscillation about an axis on the support, a mount mounted for pivoting on the gimbal about a pivoting axis at right angles to the axis of oscillation of the gimbal on the support, said mount rigidly supporting the part to be cut, a rotating tool capable of travel relative to the support, angular setting means for the gimbal by succesive orientations with respect to the support, angular setting means for the mount by successive orientations with respect to the gimbal, and relative setting means for the tool according to its successive relative positions with respect to the support.

2. A cutting machine as claimed in claim 1, for cutting parts to be machined to obtain a surface substantially differing from that of a sphere, in which the tool possesses a spherical abrading surface located about a center and rotates about an axis passing through that center.

3. A cutting machine as claimed in claim 1, for cutting parts to be machined to obtain a spheroidal surface, in which the axis of oscillation of the gimbal on the support and the axis of oscillation of the mount on the gimbal pass through the same point, the tool possessing a plane abrading surface and the relative movement of this tool with respect to the support being at least substantially one of translation in the course of which said plane abrading surface remains parallel to itself.

4. A machine for cutting a part to be machined by successive cuts, comprising a stand, a support mounted slidable on the stand, a screw allowing displacement of the support by sliding along the stand into successive relative positions of the support with respect to the stand, a gimbal mounted for oscillation about an axis on the support, means for angular setting of the gimbal by succesive orientations with respect to the support, a mount mounted pivotable on the gimbal about a pivoting axis at right angles to the axis of oscillation of the gimbal on the support, said mount rigidly supporting the part to be cut, means for angular setting of the mount by successive orientations with respect to the gimbal and a rotating tool mounted on the stand in front of the mount and in front of the part to be cut carried by that mount.

5. A machine for cutting a part to be machined by successive cuts, comprising a stand, a support mounted for oscillation about an axis on the stand, a screw screwed into the support and thrusting against the stand, said screw enabling the support to be tilted on the stand into successive positions of that support with respect to the stand, a gimbal mounted for oscillation about an axis on the support, means for the angular setting of the gimbal by successive orientations with respect to the support, a mount mounted pivotable on the gimbal about a pivoting axis at right angles to the axis of oscillation of the gimbal on the support, said mount rigidly supporting the part to be cut, means for the angular setting of the mount by successive orientations with respect to the gimbal and a tool mounted on the stand in front of the mount and in front of the part to be cut carried by that mount.

6. A machine for cutting a part to be machined by successive cuts, as claimed in claim 5, in which the axis of oscillation of the gimbal with respect to the support is parallel to the axis of oscillation of the support with respect to the stand.

7. A machine for cutting a part to be machined by successive cuts, comprising a stand, a support mounted slidable on the stand, a screw allowing the support to be displaced by sliding on the stand into successive positions of that support with respect to that stand, a gimbal mounted for oscillation about an axis on the support, a toothed sector rigidly carried by the gimbal and located on the oscillation axis of the gimbal with respect to the support, a worm mounted for rotation in the support and meshing with said toothed sector, said worm permitting angular setting of the gimbal by successive orientations with respect to the support, a mount mounted pivotable on the gimbal about a pivoting axis at right angles to the axis of oscillation of the gimbal on the support, said mount rigidly supporting the part to be cut, a toothed sector rigidly carried by the mount and located on the pivoting axis of the mount with respect to the gimbal, a worm mounted for rotation in the gimbal and meshing with said toothed sector, this worm permitting angular setting of the mount by successive orientations with respect to the gimbal, and a rotating tool mounted on the stand in front of the mount and in front of the part to be cut carried by that mount.

8. A machine for cutting a part to be machined by successive cuts, as claimed in claim 7, in which the support slides over the stand in a rectilinear direction, the oscillation axis of the gimbal on the support being perpendicular to that rectilinear direction.

References Cited in the file of this patent

UNITED STATES PATENTS

| | | |
|---|---|---|
| 2,779,138 | Collar | Jan. 29, 1957 |
| 2,836,939 | White | June 3, 1958 |